Figure 8:
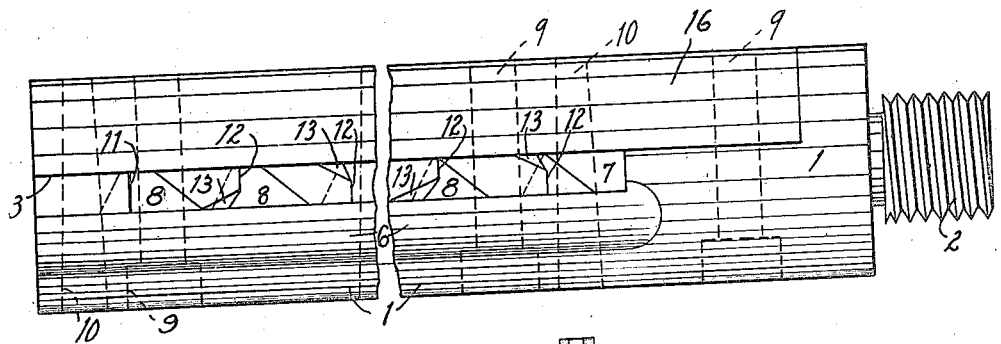

J. OAKLEY.
BROACH.
APPLICATION FILED APR. 19, 1921.
1,432,410.
Patented Oct. 17, 1922.
2 SHEETS—SHEET 1.
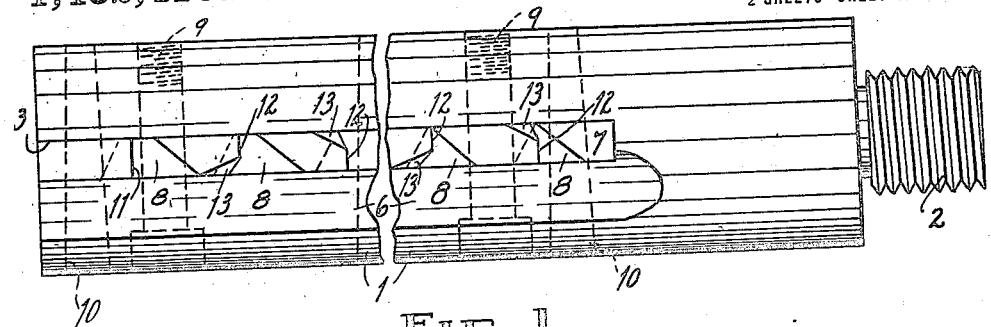
FIG_1_
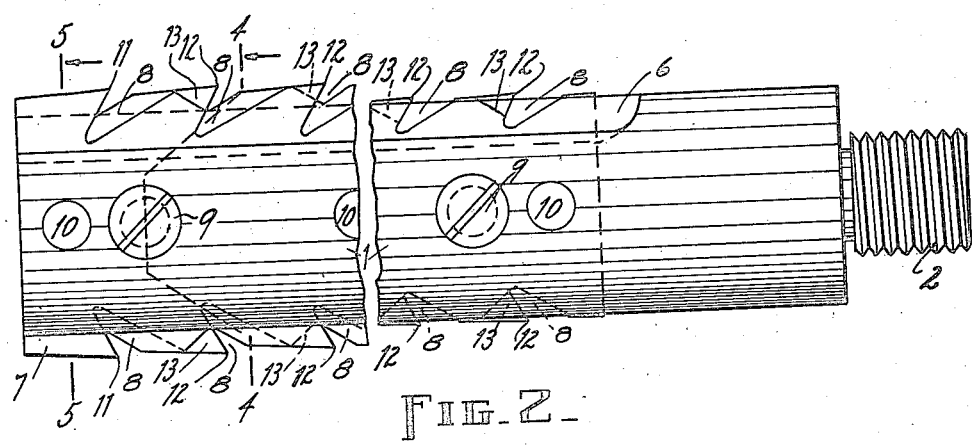
FIG_2_
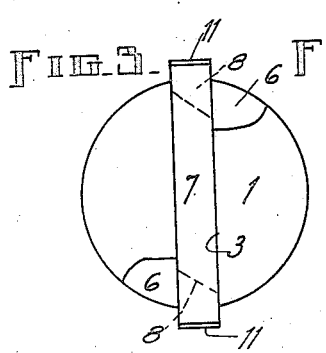
FIG_3_
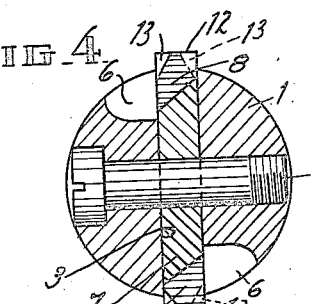
FIG_4_
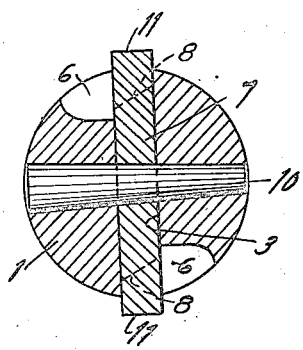
FIG_5_
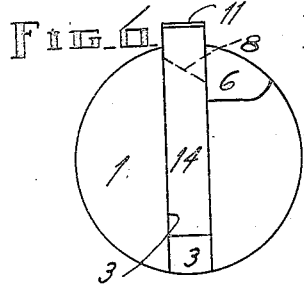
FIG_6_
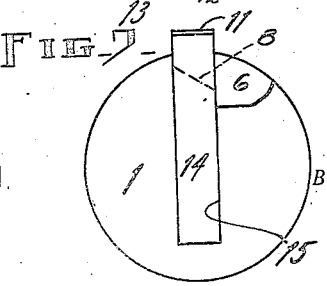
FIG_7_
INVENTOR.
John Oakley,
BY Frank A. Cutter,
ATTORNEY.

John Oakley, INVENTOR.

BY

Frank A. Cutter, ATTORNEY.

Patented Oct. 17, 1922.

1,432,410

UNITED STATES PATENT OFFICE.

JOHN OAKLEY, OF SPRINGFIELD, MASSACHUSETTS.

BROACH.

Application filed April 19, 1921. Serial No. 462,529.

*To all whom it may concern:*

Be it known that I, JOHN OAKLEY, a subject of the King of England, and a resident of Springfield, in the county of Hampden and State of Massachusetts, have invented a new and useful Broach, of which the following is a specification.

My invention relates to improvements in broaches for cutting internal slots or grooves, and consists essentially of a divided or slotted shank having therein a longitudinal, chip-clearance passage or passages, which open interiorly into the slot in said shank, and exteriorly through the periphery and the rear end of the shank, a cutter bar provided on one or both longitudinal edges with teeth, said bar being receivable in said slot, adapted to have the row or rows of teeth project beyond said shank, and having lateral, chip-clearance passages between said teeth and extending inwardly at an incline to open into said first-named chip-clearance passage or passages, and means to fasten or secure said bar in place in said shank, all as hereinafter set forth.

In many if not most cases, the teeth of this broach, with the exception of one or more teeth at the rear end, are slabbed off on alternate sides, so that each of such teeth cuts only a little more than one-half of the width of the slot which it assists in forming.

One object of my invention is to produce a broach of this character at the minimum cost, yet one which is strong, durable, accurate, and efficient. This is accomplished by forming a plurality of teeth from a single bar on one or both longitudinal edges thereof, cutting the required chip-clearance passages in said bar and in the shank, and uniting the bar with the shank in such a manner that exact alignment of the teeth and proper projection of the same are obtained. All of the work of making this broach can be done with the expenditure of comparatively little time, labor, and money, when other types of broaches for a similar purpose are considered.

The cutter bar can be readily removed from the shank for regrinding, or for the substitution of another bar therefor, as may be desired. Teeth constructed in this manner, that is to say, as integral parts of a bar, can be easily and accurately reground, much more so, in fact, than can independent or separable teeth on the one hand, or teeth that are integral with the shank in which there is no separable bar, on the other hand.

Other objects and advantages will appear in the course of the following description.

I attain the objects and secure the advantages of my invention by the means illustrated in the accompanying drawings, in which—

Figure 1 is a top plan of a broach, the central portion of the same being broken out, which embodies a practical form of my invention; Fig. 2, a side elevation of said broach, broken out in the center as before; Fig. 3, a rear end elevation of the broach; Fig. 4, a cross section through the broach, taken on lines 4—4, looking in the direction of the associated arrow, in Fig. 2; Fig. 5, a cross section on lines 5—5, looking in the direction of the associated arrow, Fig. 2; Fig. 6, a rear end elevation of a broach having a single row of teeth; Fig. 7, a similar elevation, showing a slight modification; Fig. 8, a top plan similar to the first view, except that the shank is made up of separate, independent, or separable members, and, Fig. 9, another similar plan illustrating a slightly different shank made up of separate, independent, or separable members.

The right-hand end of the broach, as it appears in the drawings, is the front end thereof, regardless as to whether the broach be pulled through the work, as is the more usual procedure, or be pushed or forced through from behind, inasmuch as the leading and least projecting tooth or teeth of the broach are the right-hand teeth, and the teeth project more and more as the rear end of the broach is approached.

The terms top, bottom, and side, or equivalent terms, apply to the broach as it is represented in the drawings, and would not always be applicable to the same as it might be disposed for some kinds of work or in certain machines.

The broach illustrated in the first five views, which broach has oppositely-disposed rows of teeth, comprises a one-piece shank 1 which has at the front end a puller or screw-threaded projection 2 by means of which the shank is attached to the machine in which the same is employed, and is longitudinally slotted, centrally, from the rear end to a point a short distance from said front end, as at 3, and is longitudinally recessed in opposite sides of the periphery, from said rear end to points which may be a little in advance of the transverse plane at the closed end of said slot, to form diametrically-opposite, chip-clearance passages 6—6, and a cutter bar 7 provided on both longitudinal edges with teeth which will presently be described in detail, there being obliquely-transverse, chip-clearance passages 8 in said bar between the teeth in each set. The passages 8 in both sets have the same direction of inclination laterally, consequently such passages in one longitudinal edge of the bar open into the passage 6 on that side, and such passages 8 in the other longitudinal edge of the bar open into the passage 6 on the opposite side. The passages 8 also have a rearward inclination, or their rear sides or edges have such an inclination, the same corresponding with that of the rake of the teeth.

Suitable means must be provided for securing the bar 7 in place in the slot 3 in the shank 1, and causing the slotted portions of said shank tightly to embrace said bar. Such means preferably consists of a plurality of screws 9 and taper pins 10, all extending transversely through the slotted portions of the shank 1 and through the bar 7, said screws being tapped into said shank, and said pins being driven into said shank and through said bar. The screws 9 and the pins 10 must not, of course, protrude at any point from the openings therefor in the periphery of the slotted portions of the shank 1. Upon unscrewing and removing the screws 9, and driving out the pins 10, the release of the bar 7 is effected, and the latter can be removed from the shank 1. Then the same shank or another is inserted in the slot 3, and the screws 9 and pins 10 are returned to place.

As previously stated, one or more of the rear teeth in the row on each longitudinal edge of the bar 7 are wide teeth, that is to say, the cutting edge of each of said teeth is of the same width as that of the slot which said row is designed to cut, while the cutting edges of the other teeth in the same row are narrower, so that each is less in width than the width of said slot. The wide teeth are represented by the numeral 11 and the narrow teeth by the numeral 12. Each tooth 12 or its cutting edge is made narrower by beveling or slabbing off one corner thereof, as represented at 13. Every other tooth 12 in each row is slabbed off on the same side, and the teeth between are all slabbed off on the opposite side, so that the cutting edge of one tooth is in offset relation to the cutting edge of the tooth which leads or follows the same, although the cutting edges of all of the teeth extend inwardly from the sides of the bar 7 or of said teeth beyond the major central plane of said bar. By thus extending the cutting edge of first one tooth 12 from one side of the bar 7 inwardly beyond the longitudinal center of said bar, and of the next tooth from the opposite side of said bar inwardly beyond said center, each two adjacent teeth cut a slot of the required width, the cutting edges of such teeth combined being commensurate with the cutting edge of either tooth 11. Adjacent pairs of the teeth 12 in a row which have the offset cutting edges may have the same amount of projection, or the following tooth may project slightly more than the preceding tooth, as may be desired, since the slots cut by these teeth are finally finished by the tooth 11 in said row at the rear end of the broach. In the present case there is only one tooth 11 on each longitudinal edge of the bar 7.

By locating the chip-clearance passages 6 on opposite sides of the bar 7, instead of both on the same side of said bar with the chip-clearance passages 8 in said bar delivering into them, the broach has a more balanced operation, and is capable of cutting slots without chattering, with less liability on the part of the teeth to get out of alignment, and to better advantage generally.

In practice, as the broach is forced through the bore in a piece of work, two oppositely-disposed slots are cut in the sides of said bore by the teeth 12 and 11, such teeth cutting deeper and deeper the full width of the slots as the broach advances, and said teeth 11 finally completing the slots and removing any unevenness that may have been left in the innermost sides thereof. Thus the slots are cut to the required depth and width. The chips cut by the teeth 12 pass down the faces of the teeth and inwardly and laterally through the passages 8 to the passages 6 on opposite sides of the bar 8, and through said last-named passages to escape at the rear end of the shank 1.

The principal object of slabbing off the teeth 12 at 13 is to limit the width of the chips cut by said teeth, so that they can escape easily through the passages 8 into the passages 6 without clogging or having a tendency to tear or otherwise injure the adjacent portion of the stock which is being slotted. Each tooth 12 cuts a chip which is only slightly wider than one-half of the width of the slot being cut, consequently said chip easily passes through the channels provided in the broach for its escape during the broaching operation, whereas, if the chip were of the full width, it would be liable not only to clog such channels, but also to scrape against the edge of the slot being cut, which edge in the latter case would be in the path of the chip as it passed from the lateral channel in which the chip is first received, into the longitudinal channel which next receives the chip.

In each of Figs. 6 and 7, a cutter bar is represented at 14, which has a row of teeth on one longitudinal edge only, the rearmost tooth 11 of such row appearing. Such being the case, only one longitudinal, chip-clearance passage 6 in the shank 1 is needed. Otherwise these constructions are the same as the first, except that in the Fig. 7 construction there is a slot 15 which extends only part way through the shank 1, instead of all the way through the shank, like the slot 3 in each of the other examples, so that a support is afforded for the bottom or inner, longitudinal edge of the bar 14. The obliquely-transverse, chip-clearance passages 6 are present in each bar 14, as before. The operation of either of the broaches having a single row of teeth is practically the same as that of the broach having two rows, except that only one slot is cut with the former, instead of two as with the latter.

Figure 9:
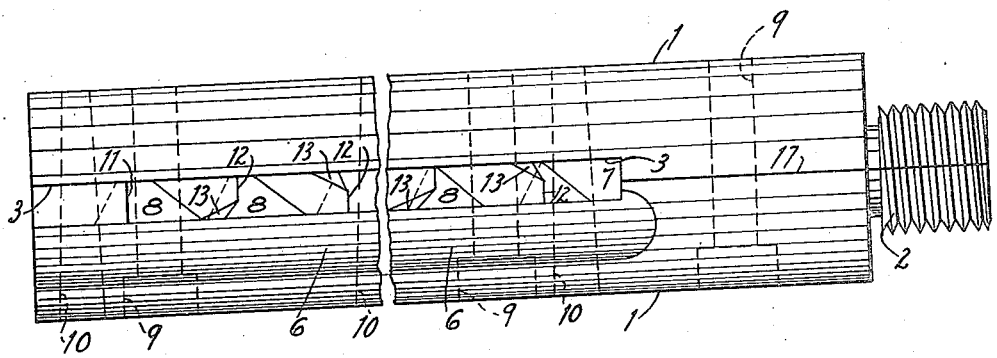

The shank 1, instead of being made in a single piece, may be constructed out of two or more pieces which are securely fastened together as shown in Figs. 8 and 9, and to which the bar 7 (or 14) is securely attached, a slot for such bar being provided in all cases.

In Fig. 8 the shank 1 therein shown consists in part of a section 16 which is initially separate from and independent of the other portion of said shank. The section 16 is rigidly and securely attached to the other portion of the shank by means of the screws 9 and pins 10 which fasten the cutter bar 7 (or 14) in place, and one or more additional screws as may be required. This section is set into one side of the other portion of the shank, and with its inner face forms one side of the slot 3 (or 15) for the cutter bar 7 (or 14). The rear end of the section 16 is flush with the rear end of the other portion of the shank, but, while the front end of said section extends forwardly beyond the corresponding end of the slot 3 (or 15), it does not extend far enough to form any part of the front end of the shank.

In Fig. 9 the shank 1 is made in two sections of equal dimensions divided on a plane, indicated by the line 17, which extends from the longitudinal center of the front end of the slot 3 (or 15) forwardly to the front end of the puller head 2. One or more additional screws 9 are provided in this as in the previous construction.

The construction in other respects and the operation of the broaches shown in the last two views are the same as has hereinbefore been fully described and explained.

It is to be understood that the term slot or slotted as herein used, relates to the slot which is provided in the shank to receive the cutter bar, regardless of the manner in which said slot is produced, since the manner of producing the same in a shank comprising originally separate and independent parts would be different from that in a shank consisting of a single piece.

More or less change in the shape, size, construction, and arrangement of some or all of the parts of this broach, besides the modifications illustrated and described herein in detail, may be made without departing from the spirit of my invention or exceeding the scope of what is claimed.

I am aware that stationary holders have been employed through which tooth-provided bars or broaches have been drawn, but such a construction necessitates the use of a very much longer and a very much weaker broach than is the broach herein presented, and the work done by the former is liable to be less accurate than that done by the latter.

What I claim as my invention, and desire to secure by Letters Patent, is—

1. As an improved article of manufacture, a broach comprising a shank having an exterior longitudinal chip-clearance passage therein, a bar provided with teeth on a longitudinal edge thereof, and having lateral chip-clearance passages therein between said teeth, which last-named passages open into said first-named passage, said shank being slotted to receive said bar, and means to secure said bar in place in the slot in said shank.

2. As an improved article of manufacture, a broach comprising a shank having exterior longitudinal chip-clearance passages therein, a bar provided with teeth on the opposite longitudinal edges thereof, and having lateral chip-clearance passages therein between said teeth, which last-named passages open into said first-named passage, said shank being slotted to receive said bar, and said first-named passages being on opposite sides of said bar, and means to secure said bar in place in the slot in said shank.

3. As an improved article of manufacture, a broach comprising a shank having an exterior longitudinal chip-clearance passage therein, a bar provided with teeth on a longitudinal edge thereof, and having lateral chip-clearance passages therein between said teeth, which last-named passages open into said first-named passage, said shank being solid at the leading terminal and there provided with a puller projection, and slotted back of said terminal to receive said bar, and removable means to secure said bar in place in the slot in said shank.

4. As an improved article of manufacture, a broach comprising a shank having an exterior longitudinal chip-clearance passage therein, a bar provided with a single row of teeth on a longitudinal edge thereof, certain of said teeth being slabbed off to narrow their cutting edges, and said bar having lateral chip-clearance passages therein between said teeth, which last-named passages open into said first-named passage, said shank being slotted to receive said bar, and means to secure said bar in place in the slot in said shank.

5. As an improved article of manufacture, a broach comprising a shank having an exterior longitudinal chip-clearance passage therein, a bar provided with a single row of teeth on a longitudinal edge thereof, certain of said teeth being slabbed off on one side, and certain others of said teeth being slabbed off on the other side, to narrow their cutting edges, and said bar having lateral chip-clearance passages therein between said teeth, which last-named passages open into said first-named passage, said shank being slotted to receive said bar, and means to secure said bar in place in the slot.

6. As an improved article of manufacture, a broach comprising a shank having an exterior longitudinal chip-clearance passage therein, a bar provided with a single row of teeth on a longitudinal edge thereof, certain of said teeth being slabbed off to provide cutting edges which are narrower than the full width of the slot cut by the broach, and arranged so that some of such edges extend from one direction beyond the longitudinal center of said bar, and others of such edges extend from the opposite direction beyond said center, and said bar having lateral chip-clearance passages therein between said teeth, which last-named passages open into said first-named passage, said shank being slotted to receive said bar, and means to secure said bar in place in the slot in said shank.

7. As an improved article of manufacture, a broach comprising a shank having an exterior longitudinal chip-clearance passage therein, a bar provided with a single row of teeth on a longitudinal edge thereof, certain of said teeth being slabbed off to provide cutting edges which are narrower than the full width of the slot cut by the broach, and arranged so that every other of said cutting edges extends from one direction beyond the longitudinal center of said bar, and the cutting edges between extend from the opposite direction beyond said center, and said bar having lateral chip-clearance passages therein between said teeth, which last-named passages open into said first-named passage, said shank being slotted to receive said bar, and means to secure said bar in place in the slot in said shank.

8. As an improved article of manufacture, a broach comprising a centrally-slotted shank having therein diametrically-opposite longitudinal chip-clearance passages which are on opposite sides of the slot in and open through the periphery of said shank, a bar receivable in said slot and provided with a single row of teeth on the opposite longitudinal edges thereof, certain of said teeth being slabbed off on the outside to narrow their cutting edges, the slabbed portions of every other of such teeth being on the one side and the slabbed portions of such teeth which are between being on the other side, and said bar having lateral chip-clearance passages therein between said teeth, which last-named passages open into said first-named passages, and means to secure together said shank and bar.

9. As an improved article of manufacture, a broach comprising a shank having an exterior longitudinal chip-clearance passage therein, a bar provided with a single row of teeth on a longitudinal edge thereof, certain of said teeth being slabbed off on the sides to provide cutting edges of less width than that of the slot to be cut, and arranged so that such cutting edges are in offset relation to each other, and said bar having lateral chip-clearance passages therein between said teeth, which last-named passages open into said first-named passage, said shank being slotted to receive said bar, and means to secure said bar in place in the slot in said shank.

JOHN OAKLEY.

Witnesses:
A. C. FAIRBANKS,
F. A. CUTTER.